(12) United States Patent
Sharma

(10) Patent No.: US 10,637,781 B2
(45) Date of Patent: Apr. 28, 2020

(54) METHOD FOR RELIABLE DATA DELIVERY BETWEEN TUNNEL ENDPOINTS USING BFD PROTOCOL

(71) Applicant: Nicira, Inc., Palo Alto, CA (US)

(72) Inventor: Ankur Kumar Sharma, Mountain View, CA (US)

(73) Assignee: Nicira, Inc., Palo Alto, CA (US)

(*) Notice: Subject to any disclaimer, the term of this patent is extended or adjusted under 35 U.S.C. 154(b) by 71 days.

(21) Appl. No.: 15/939,131

(22) Filed: Mar. 28, 2018

(65) Prior Publication Data

US 2019/0306060 A1    Oct. 3, 2019

(51) Int. Cl.
*H04L 12/801* (2013.01)
*H04L 29/08* (2006.01)
*H04L 29/06* (2006.01)

(52) U.S. Cl.
CPC .............. *H04L 47/12* (2013.01); *H04L 69/22* (2013.01); *H04L 69/325* (2013.01)

(58) Field of Classification Search
None
See application file for complete search history.

(56) References Cited

U.S. PATENT DOCUMENTS

| | | | | |
|---|---|---|---|---|
| 10,075,567 | B1 * | 9/2018 | Licking | H04L 45/74 |
| 2016/0254991 | A1 * | 9/2016 | Eckert | H04L 45/16 |
| | | | | 370/225 |
| 2017/0302519 | A1 * | 10/2017 | Kumar | H04L 41/0853 |
| 2017/0346730 | A1 * | 11/2017 | Menon | H04L 45/745 |
| 2018/0219980 | A1 * | 8/2018 | McCulley | H04L 1/0041 |

OTHER PUBLICATIONS https://tools/ietf.org/html/rfc7419, "Internet Engineering Task Force (IETF) Request for Comment (RFC) 7419 document, published Dec. 2014".
https://tools.ietf.org/html/rfc7880, "Internet Engineering Task Force (IETF) Request for Comment (RFC) 7880 document, published Jul. 2016".
https://tools.ietf.org/html/rfc5880. "Internet Engineering Task Force (IETF) Request for Comment (RFC) 5880 document, published Jun. 2010".

* cited by examiner

*Primary Examiner* — Shripal K Khajuria
(74) *Attorney, Agent, or Firm* — Patterson + Sheridan, LLP

(57) ABSTRACT

The disclosure provides an approach for reliable and secure data delivery on a data plane of a network between virtual tunnel endpoints of hypervisors. The approach involves using the Bidirectional Forwarding Detection protocol to transport additional information without adding to network congestion. Data is added to periodic health-check packets and processed by the receiving side. The packets are further modified to set an echo bit and receive an acknowledgement of the packets' successful transmission to the destination side.

18 Claims, 3 Drawing Sheets

METHOD FOR RELIABLE DATA DELIVERY BETWEEN TUNNEL ENDPOINTS USING BFD PROTOCOL

BACKGROUND

Software-defined networking (SDN) based data centers often utilize virtual machines (VMs) or other virtual computing instances (e.g., containers, Docker containers, data compute nodes, isolated user space instances, namespace containers, etc.) that run within host computers. The host computers may be interconnected by a physical network infrastructure. Deployment of VMs within a host allows VMs to share the host's hardware resources, such as central processing unit (CPU) cycles, memory, etc. Hypervisors running on the hosts serve as an interface between the VMs and the hardware resources of the hosts.

As part of the operation of the data center, hypervisors may need to communicate control information between one another. For example, as a hypervisor's state changes, the hypervisor may communicate such a state change to other hypervisors in the data center to facilitate networking within the data center. An example of such a state change includes migration of a VM from a first host to a second host. In this example, the hypervisor of the second host may communicate to other hypervisors on other hosts in the data center that the VM is now located on the second host. Other hypervisors may utilize the state change information received from the hypervisor of the second host to modify their forwarding tables so that packets destined for the migrated VM are properly addressed to the VM on the second host.

For certain control information, such as the example of hypervisor state information, each hypervisor in the data center may need to be guaranteed to receive the control information, otherwise the data center may not function properly. To ensure that packets containing control information reach their destination, the packets may be sent between the hypervisors and one or more central servers (e.g., a central control plane (CCP) or management plane (MP)) server using a reliable protocol such as TCP so that the CCP or MP can relay control messages between the hypervisors.

However, centralized exchange of control information via a central server may delay the receipt of the control information by hypervisors in the data center, particularly if the central server is busy with other tasks. The delay may cause problems within a data center. For example, after a VM migrates from a first to a second host, packets intended for the VM may be sent to the first host until the hypervisor of the second host notifies all other hypervisors, through the central server, which can result in dropped packets.

SUMMARY

A method described herein provides data delivery, on a network, between a first host and a second host, the method comprising determining whether the first host has control information to send to the second host, and generating a packet according to a Bidirectional Forwarding Detection (BFD) protocol. The method further provides setting a flag in the packet to activate an acknowledgment mechanism, including a control message in the packet as a payload of the packet wherein the control message comprises the control information, and transmitting the packet from the first host to the second host.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The disclosure provides techniques for reliable data delivery between devices using the bidirectional forwarding detection (BFD) protocol. Certain techniques are described herein with respect to reliable delivery of control information between hypervisors running on hosts in a SDN data center. However, it should be noted that such techniques may also be applied to reliable delivery of other types of data between other types of network entities. Certain embodiments include modifying packets of the BFD protocol to include additional information, such as control information. For example, in certain embodiments, modules within hypervisors periodically exchange BFD packets to communicate that their respective hypervisors are up and running as expected. Such BFD packets, according to embodiments described herein, can be used to exchange additional information between hypervisors without requiring additional packets be transmitted over the network, or the generation and processing of additional packets. This can beneficially reduce the use of network bandwidth and the use of compute cycles for processing packets at both the source and destination side for communicating the additional information.

Further, according to the BFD protocol, a flag (e.g., ECHO flag) can be set in the header of the BFD packet marking it as an ECHO type BFD packet. That is, the BFD protocol may run under the ECHO function. When a BFD packet is marked as an ECHO type packet, a destination device, according to standard BFD protocol, will resend the BFD packet back to the source of the BFD packet. In certain embodiments, BFD packets are used to exchange additional information as described herein may be marked as ECHO type packets to serve an acknowledgement of receipt of the additional information. Accordingly, techniques described herein utilizing BFD packets for direct exchange of additional information, such as control information, between hypervisors may provide benefits over other communication protocols conventionally used for data exchange between hypervisors, such as User Datagram Protocol (UDP), which do not provide any guarantee of successful data exchange or acknowledgment function, or TCP, which provides a reliable transport mechanism, but with additional, and computationally expensive features such as congestion control window sizing and in-order packet delivery, which is not necessary for many types of message delivery use cases, including the sending of control messages.

The BFD protocol further provides a flow control and authentication mechanism to the exchange of data between a source and destination, as described in further detail below.

Figure 1:
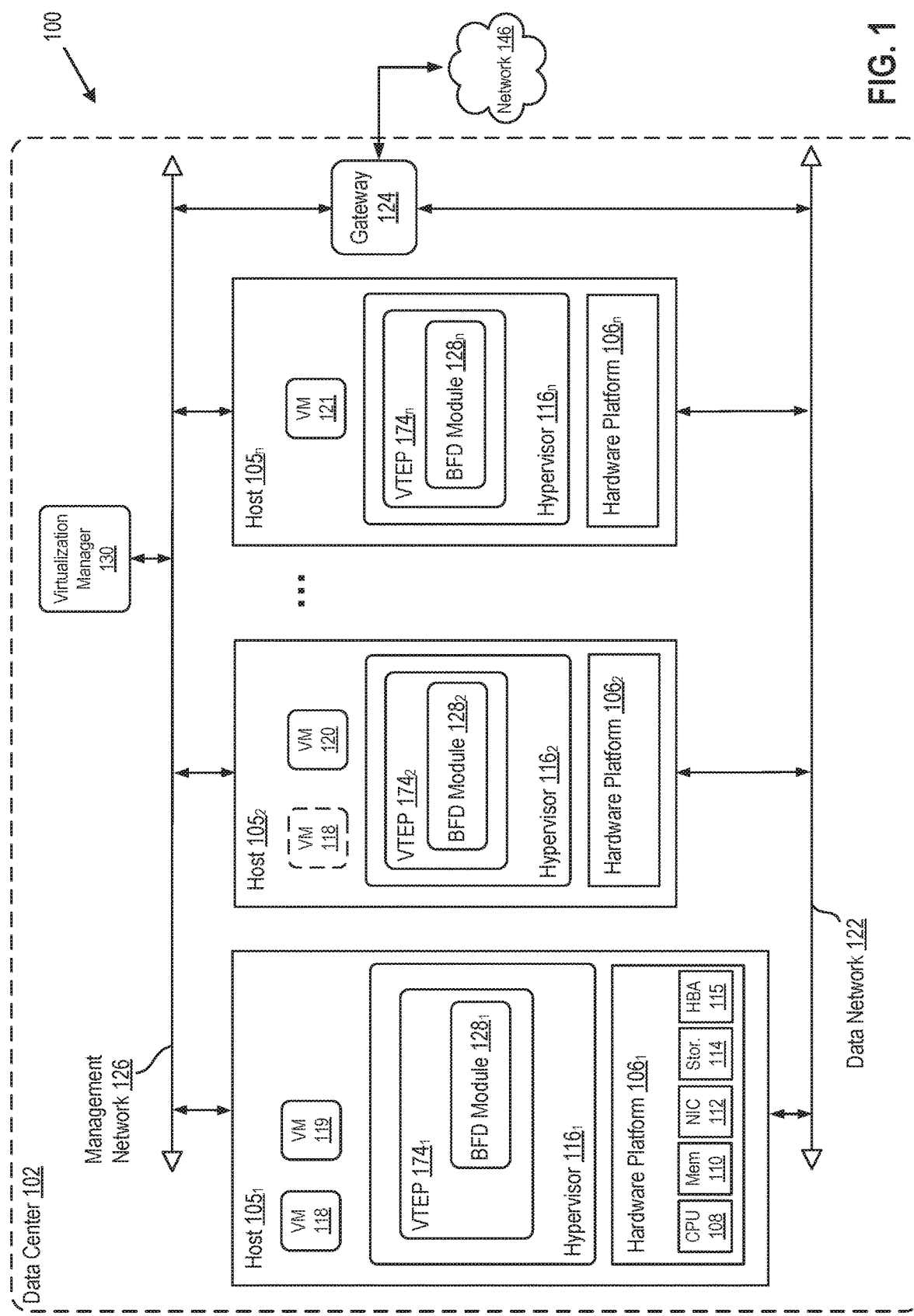
FIG. 1 depicts a block diagram of a computer system in which one or more embodiments of the present disclosure may be utilized.

FIG. 1 depicts a block diagram of a computer system 100 in which one or more embodiments of the present disclosure may be utilized. Data center 102 may be an on-premise data center or a cloud data center. Data center 102 includes host(s) 105, a virtualization manager 130, a gateway 124, a management network 126, and a data network 122. Although the management and data network are shown as separate physical networks, it is also possible in some implementations to logically isolate the management network from the data network using different VLAN identifiers. Each of hosts 105 may be constructed on a server grade hardware platform 106, such as an x86 architecture platform. For example, hosts 105 may be geographically co-located servers on the same rack or on different racks in any arbitrary location in datacenter 102. Host $105_2$ is shown as containing VM 118, with VM 118 depicted in dashed lines. The dashed lines indicate that VM 118 is being migrated from host $105_1$ to host $105_2$, as further discussed with reference to FIG. 3, below.

Host 105 is configured to provide a virtualization layer, also referred to as a hypervisor 116, that abstracts processor, memory, storage, and networking resources of hardware platform 106 into multiple virtual machines, e.g., VMs 118 and 119 on host $105_1$, VM 120 on host $105_2$, and VM 121 on host $105_n$. VMs on the same host 105 may run concurrently. The hypervisor architecture may vary. In some embodiments, a virtualization software can be installed as system level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server. In some implementations, the hypervisor may comprise system level software as well as a "Domain 0" or "Root Partition" virtual machine, which is a privileged machine that has access to the physical hardware resources of the host. In this implementation, a virtual switch, virtual tunnel endpoint (VTEP), etc., along with hardware drivers, may reside in the privileged virtual machine.

Hypervisor 116 includes an associated virtual tunnel endpoint (VTEP) 174. In the embodiment shown, VTEP 174 runs in the hypervisor 116. VTEP 174 may provide layer 2 tunneling services for encapsulating egress packets from VMs and decapsulating ingress packets to implement a logical overlay network to interconnect VMs running on different host machines as part of the same layer 2 network, as described in more detail with respect to FIG. 2. Further, one method for hypervisors 116 to communicate with one another is through the respective VTEPs 174 associated with the hypervisors 116. Each VTEP 174 may be assigned a network address (e.g., MAC address and IP address) on a physical network (e.g., data network 122) to which hots 105 are connected and address packets between each other using their network addresses. For example, VTEPs 174 may encapsulate packets using a tunneling protocol and exchange the encapsulated packets. VTEPs 174 may be implemented using tunneling protocols such as virtual extensible local area network (VXLAN), Stateless Transport Tunneling (STT), Generic Network Virtualization Encapsulation (GE-NEVE), or Generic Routing Encapsulation (GRE). VTEPs 174 are further described with reference to FIG. 2, below. Each VTEP 174 includes bidirectional forwarding detection (BFD) module 128, further described below.

It should be noted that the term VTEP originally referred to a "VXLAN tunneling endpoint." However, while originally the term "VTEP" referred to "VXLAN" tunneling protocol, it is now often used regardless of the tunneling protocol, and therefore referred to herein as a "virtual" tunneling endpoint. This "backronym" can be misleading as the tunnel is not itself virtual, but does carry logical overlay networking traffic, which is sometimes referred to as virtual network traffic.

Hardware platform 106 of each host 105 may include components of a computing device such as one or more processors (CPUs) 108, system memory 110, a network interface 112, storage system 114, a local host bus adapter (HBA) 115, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a communication medium, such as data network 122 and/or management network 126. Network interface 112 may include one or more network adapters or ports, also referred to as Network Interface Cards (NICs), for connecting to one or more physical networks. In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical network, but different network segments, such as different subnets or different logical VLAN segments.

Storage system 114 represents local persistent storage devices (e.g., one or more hard disks, flash memory modules, solid state disks, and/or optical disks). Host bus adapter (HBA) couples host 105 to one or more external storages (not shown), such as a storage area network (SAN) or distributed virtual SAN. Other external storages that may be used include network-attached storage (NAS) and other network data storage systems, which may be accessible via NIC 112.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory.

Gateway 124 provides VMs 118-121 and other components in data center 102 with connectivity to network 146. Network 146 may be, for example, a direct link, a local area network (LAN), a wide area network (WAN) such as the Internet, another type of network, or a combination of these. Gateway 124 may manage external public IP addresses for VMs 118-121 and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual computing instance, a physical device, or a software module running within host 105. Gateway 124 may include two gateways: a management gateway for management network 126 and a data gateway for data network 122.

Virtualization manager 130 communicates with hosts 105 via a network, shown as a management network 126, and carries out administrative tasks for data center 102 such as communicating with a controller for managing hosts 105, managing VMs 118-121 running within hosts 105, provisioning VMs, migrating VMs from one host to another host, and load balancing between hosts 105. Virtualization manager 130 may be a computer program that resides and executes in a central server in data center 102 or, alternatively, virtualization manager 130 may run in a virtual computing instance (e.g., a VM) in one of hosts 105.

Figure 2:
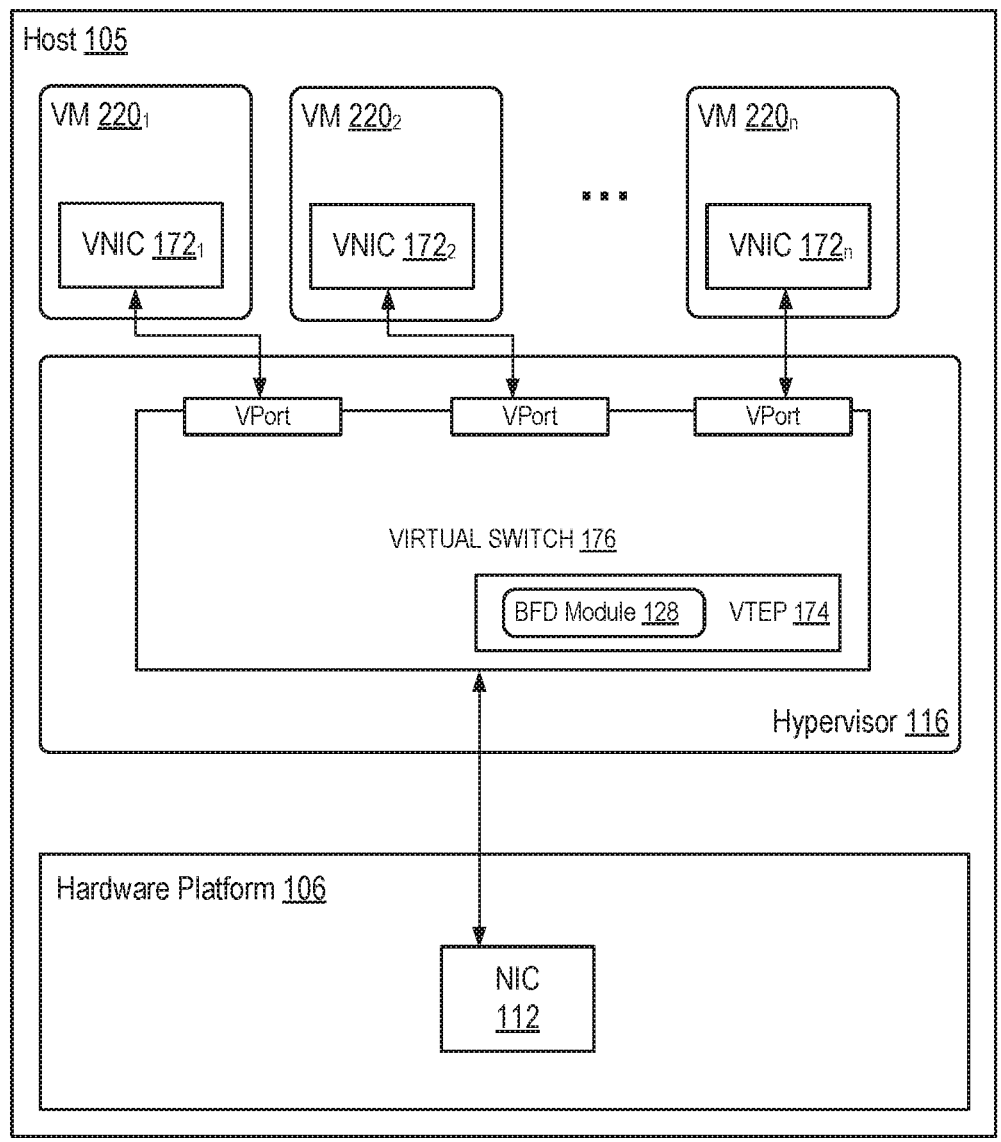
FIG. 2 depicts a block diagram showing details of host 105 running a hypervisor 116, according to an embodiment.

FIG. 2 depicts a block diagram showing details of a host 105 running a hypervisor 116, according to an embodiment. Hypervisor 116 may include a virtual switch 176, which serves as an interface between the hosted virtual machines 220 running on host 105, NIC 112, as well as other physical resources available on host 105. VMs 220 of FIG. 2 are analogous to and substantially similar to VMs 118-121 of FIG. 1. Hypervisor 116 includes VTEP 174, which may be implemented in software by virtual switch 176, or outside of virtual switch 176 (e.g., as coupled to a virtual port of virtual switch 176) and functionally coupled to virtual switch 176 using forwarding tables. Accordingly, VTEP 174 is responsible for providing VTEP services for each of the VMs 220 on the same host machine 105 as VTEP 174.

Each of the virtual machines 220 may include a virtual network interface card (VNIC) 172, which is responsible for exchanging packets between the virtual machine 220 and hypervisor 116. VNICs 172 may be, in some cases, a software abstraction of a physical network interface card. Each virtual machine 220 is connected to a virtual port (vport) provided by virtual switch 176, and virtual switch 176 is connected to physical network interface 112 to allow network traffic to be exchanged between virtual machines 220 executing on host machine 105 and other network destinations such as virtual machines hosted by other host machines on data network 122.

A logical network is implemented using VTEPs for encapsulating data packets that are generated by VMs 220, BFD module 128, or hypervisor 116 for delivery through the underlying data network 122. For example, a source VM 220 running on host 105 may generate a packet for a destination VM on another host. The packet may include in a header a source address (e.g., IP/MAC address) of the source VM 220, and a destination address of the destination VM on the other host. The source VM 220 may send the packet to virtual switch 176.

Having received the packet, virtual switch 176 determines that the destination VM is not directly coupled to the virtual switch 176 and thus forwards the packet to VTEP 174 to encapsulate the packet received from source VM 220 to generate an encapsulated packet. In particular, VTEP 174 may add a new header (referred to as an "outer header") to the original packet to generate the encapsulated packet (referred to as an "outer packet"). The original packet encapsulated by VTEP 174 may be referred to as an "inner packet" and the header of the original packet may be referred to as an "inner header." The VTEP 174 may include a source address of the VTEP 174 (e.g., source VTEP) in the outer header, and a destination address of a destination VTEP associated with the destination VM. The VTEP 174 may then forward the encapsulated packet back to virtual switch 176, which sends the encapsulated packet out of host 105 via NIC 112 based on the destination address in the outer header.

The destination VTEP 174 receives the encapsulated packet and decapsulates the encapsulated packet to extract the original packet. Based on the destination IP address in the header of the original packet, the destination VTEP 174 forwards the original packet to the destination VM 220.

In another example, BFD module 128 running in VTEP 174 may generate a BFD packet to send to a BFD module running on another host as a "hello" or "heartbeat" message, indicating to the other host that VTEP 174 is still functioning and that the connection between hosts is still active. VTEP 174 encapsulates the BFD packet and includes in the outer header the source address of source VTEP 174, and the destination address of a destination VTEP running on the other host. VTEP 174 then forwards the encapsulated packet to virtual switch 176, which sends the encapsulated packet out of host 105 via NIC 112 based on the destination address in the outer header. The destination VTEP receives the encapsulated packet and decapsulates the encapsulated packet to extract the BFD packet, which is then processed by BFD module 128.

Each VTEP 174 may include BFD module 128. BFD module 128 is an implementation of the BFD protocol, and can be present on each host 105 of data center 102, such as within VTEP 174 of hypervisor 116. In an embodiment, BFD protocol is defined by the Internet Engineering Task Force (IETF) Request for Comment (RFC) 5880 document, published in June 2010, as updated by RFC 7419 and RFC 7880.

Every time interval (e.g., predetermined, predefined, etc.), BFD module 128 sends a periodic packet to every other BFD module 128 in data center 102. This periodic packet is sometimes referred to as a "hello" packet. The purpose of the periodic "hello" packet is to indicate to every receiving BFD module 128 that VTEP 174 of the sending BFD module 128 is operating in a normal, healthy manner, and that VTEP 174 of sending BFD 128 module is not down. If a first BFD module 128 does not receive a certain number of periodic "hello" packets from a second BFD module 128 (e.g., in a row, within a time period, etc.), then the first BFD module 128 will determine that the second BFD module 128 is down.

The time interval may be, for example, a centisecond, half second, second, two seconds, or five seconds. The time interval may be set by an administrator or automatically by a software module based on, for example, network conditions or capacity of BFD modules 128 to accept and process packets. Capacity of BFD modules 128 to accept and process packets is further described below in the discussion of the flow control mechanism of the BFD protocol. The certain number of packets may be, for example, two, three, five, ten, fifty, or one-hundred. The certain number of periodic packets not received from a BFD module 128, indicating that the BFD module 128 and its VTEP 174 are down or malfunctioning, may be set by an administrator or automatically by a software module based on, for example, network conditions or the predetermined time interval. The periodic packet is sent from VTEP 174 of the sending BFD module 128 to VTEP 174 of the receiving BFD module.

The periodic "hello" packet may have a field or bit set in the BFD header to indicate that it is a periodic "hello" packet. The periodic packet may have no BFD payload, which may also serve as an indication to the receiving BFD module 128 that the received packet is a period "hello" packet. The periodic packet may include a BFD header encapsulated by a series of headers or layers. In an embodiment, the BFD header of a periodic packet is encapsulated by a transport layer header (e.g. User Datagram Protocol (UDP) header), then encapsulated by a network layer header (e.g. IP header), then encapsulated by a frame header (e.g. Ethernet), and finally encapsulated by a tunnel protocol header (e.g., VXLAN, STT, GENEVE, or GRE header). In an embodiment, encapsulation by a tunnel protocol header is used for communication between VTEPs 174.

For transport layer encapsulation, UDP may be used instead of Transmission Control Protocol (TCP) because TCP generally requires more overhead (e.g. keeping track of number of sent bytes acknowledged) than UDP in data center 102. If data center 102 is scaled to thousands of hypervisors 116, then the TCP overhead may become a bottleneck. Another reason UDP may be used instead of TCP is that a TCP connection enforces a fixed source and destination port number, lowering the number of paths that a periodic "hello" packet is able to take through data center 102. For speed of delivery, it is advantageous to be able to choose among all available network paths through data center 102. In an embodiment of the present disclosure, TCP is not used.

The BFD protocol has a built-in acknowledgement mechanism. A BFD header contains an echo flag or bit that can be set by the source BFD module 128 to request an acknowledgement packet from destination BFD module 128. The acknowledgement packet is also known as an "echo" packet. In an embodiment, an "echo" packet contains minimal information to communicate receipt of a packet to the sender. For example, an echo packet may include a BFD header, no BFD payload, and/or the BFD header may contain an acknowledgement bit or flag that has been set to TRUE, indicating that this packet is an "echo" packet for a previously sent packet. In another embodiment, an "echo" packet may be a copy of the sent packet being acknowledged, or the "echo" packet may be substantially the same as the sent packet being acknowledged (however with the appropriate header information changed such as addresses and setting the echo flag to false).

The BFD protocol also has a built-in flow control mechanism, referred to as a timer negotiation, for setting the transmission interval, or time between the sending (or receiving) of successive BFD packets. In other words, flow control is the controlling of the transmission rate of BFD packets from a source to a destination. The controlling ensures that the rate of transmission is not higher than the rate at which packets can be processed by the destination. If packet flow rate is higher than rate of processing by destination, then a packet buffer on the destination may fill up, resulting in dropped or lost packets. When BFD modules 128 send periodic "hello" packets to one another, BFD modules 128 include information within the periodic "hello" packets on how many packets the sending BFD module 128 can accept in a given time period. For example, BFD module 128$_1$ may include, within its outgoing periodic "hello" packets, capacity information on the number of packets BFD module 128$_1$ can accept or process per second.

In an embodiment, capacity information on the number of packets that BFD module 128 can accept or process is included within the BFD header. In another embodiment, capacity information on the number of packets BFD module 128 can accept or process is included within the payload of the BFD header. The capacity/capability of BFD module 128 to accept or process packets may be the same or different from the capacity of hypervisor 116—on which BFD module 128 runs—to accept or process packets that hypervisor 116 receives from BFD module 128.

The BFD protocol also has several built-in authentication mechanisms. Authentication provides a measure of assurance that the stated source of a packet is the true source of the packet. Which authentication mechanism is used for authenticating a packet may be specified in the BFD header of a packet. One authentication mechanism may be a password included within the BFD header. Another authentication mechanism may be a key and hash combination. For example, a first BFD module 128$_1$ may know the key of a second BFD module 128$_2$, and when the first BFD module 128$_1$ sends a packet to the second BFD module 128$_2$, the first BFD module 128$_1$ may include in the packet a hash of the key of the second BFD module 128$_2$. Upon receiving the packet, the second BFD module 128$_2$ may check that the hash within the BFD header of the received packet matches the hash of the key of the second BFD module 128$_2$.

The above described implementation of the BFD protocol may be used to transmit additional information on the data plane, between VTEPs 174 of hypervisors 116, in a reliable and secure manner. That is, the BFD protocol may be used to transmit important control information, such as state change information, from one hypervisor 116 to other hypervisors 116. Because periodic packets are already flowing through the network(s) of data center 102 between BFD modules 128, information may be added to the BFD payload of the periodic packets without having to send additional packets, and thus, without significantly adding congestion to the network(s) of data center 102. The method and system of transmitting control information is described in more detail with reference to FIG. 3.

Figure 3:
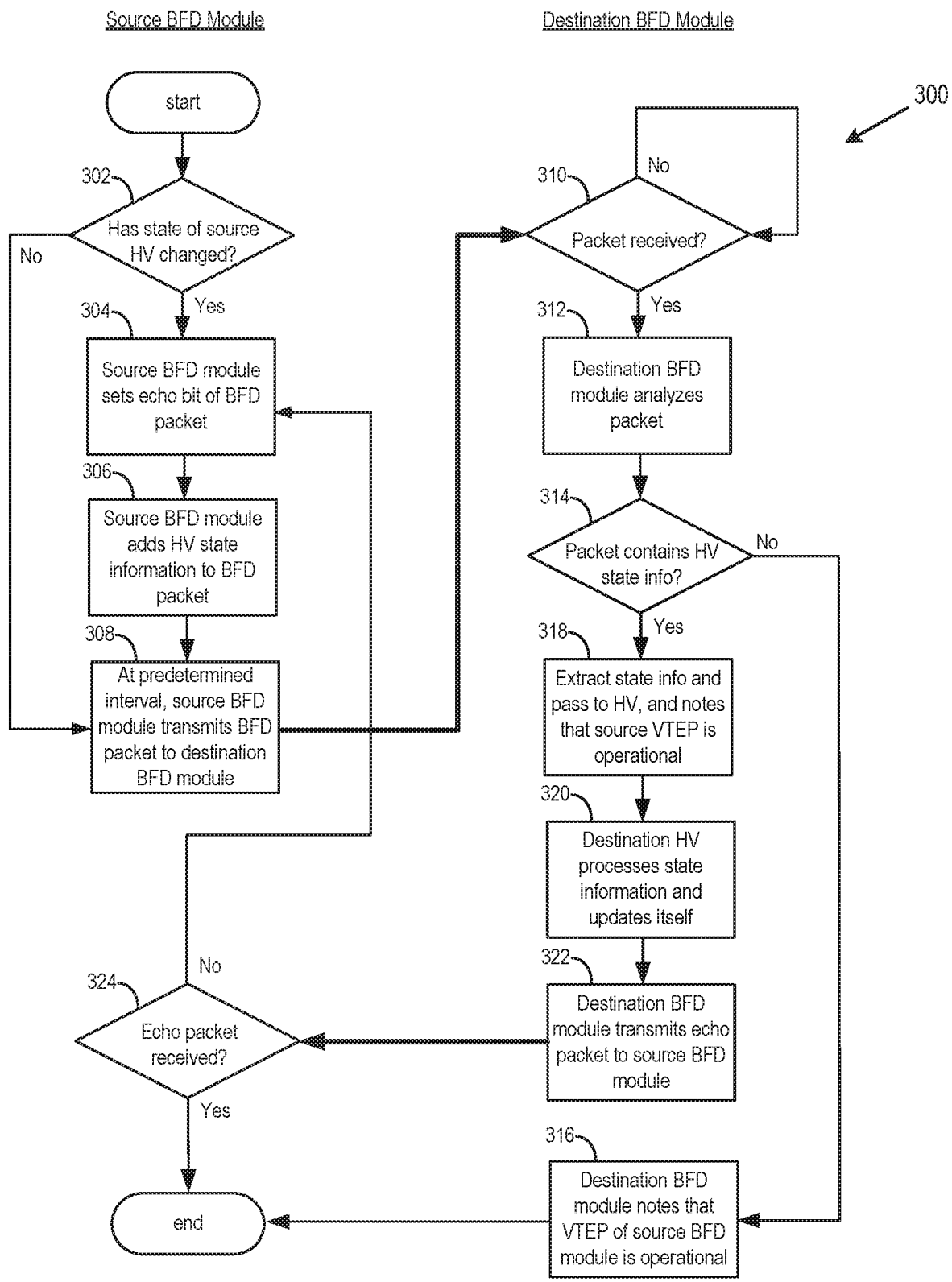
FIG. 3 depicts a flow diagram of a method of reliable and secure data delivery between virtual tunnel endpoints, according to an embodiment.

FIG. 3 depicts a flow diagram of a method of reliable and secure data delivery between hypervisors, according to an embodiment. Method 300 may be performed by every hypervisor 116 in data center 102, or a subset of hypervisors. Method 300 may be performed at a time interval, such as an interval that is substantially the same as the time interval of the periodic "hello" packets exchanged by BFD modules 128, discussed above. An additional trigger for the start of method 300 may be the occurrence of a state change of hypervisor 116.

To illustrate method 300, an example of migrating VM 118 from host 105$_1$ to host 105$_2$ is used as an exemplary change of state of hypervisor 116$_2$ that requires state change information to be transmitted to a set of other hypervisors as control information. VM 118 is drawn in dashed lines in FIG. 1 to show the migration. In the example, hypervisor 116$_2$ wishes to inform all, or a subset of other hypervisors 116 in data center 102 that VM 118 is now located on VTEP 174$_2$ of host 105$_2$. For example, hypervisor 116$_2$ (or 116$_1$) may inform other hypervisors that have VMs in communication with the VM being migrated that the VM has moved.

At block 302, hypervisor 116 determines whether its state has changed. If the state of hypervisor 116 has not changed, then method 300 proceeds to block 308, at which block an unmodified periodic "hello" packet is sent from BFD module 128 of hypervisor 116 to all other BFD modules 128 of data center 102. If the state of hypervisor 116 has changed, then method 302 proceeds to block 304. Following the above example, at block 302, hypervisor 116$_2$ determines that the state of hypervisor 116$_2$ has changed as a result of the completed migration of VM 118 to host 105$_2$ and the subsequent association of VM 118 to VTEP 174$_2$.

At block 304, BFD module 128 begins to configure the periodic "hello" packet to include information about the changed state of hypervisor 116. Following the above example, at block 304, BFD module 128$_2$ of hypervisor 116$_2$ configures the periodic packet by setting the echo bit of the packet, such as to 1 or TRUE. For the purpose of illustrating method 300, BFD module 128$_2$ may be referred to as the "source" BFD module 128 for the purpose of method 300, because BFD module 128$_2$ is the sender of the modified periodic BFD packet containing updated state information of hypervisor 116$_2$. Similarly, other components on host 105$_2$ or associated with VTEP $174_2$ may be referred to as "source" components because they are on source host 105 and associated with source VTEP $174_2$ that contains source BFD module $128_2$.

At step 306, source BFD module $128_2$ adds updated state information of hypervisor $116_2$ to the periodic packet in which the echo bit was set to TRUE. In an embodiment, the updated state information is added as a control message to the BFD payload of the periodic packet. Following the example, information added to the periodic packet is information indicating that VM 118 is located on VTEP $174_2$ of hypervisor $116_2$ on host $105_2$.

At block 308, at the predetermined interval for sending periodic "hello" packets, source BFD module $128_2$ transmits a periodic packet to all other BFD modules 128 in data center 102. If block 308 is reached from block 302, then the periodic packet is the usual, unmodified periodic "hello" packet, such as for example, with an empty BFD payload. If block 308 is reached from block 306, then the periodic packet is a modified periodic packet with an echo bit set to TRUE and containing state information of source hypervisor $116_2$. As part of block 308, source BFD module $128_2$ may also add data for authentication to the periodic packet, and may also add flow control data on capacity/capability of BFD module $128_2$ to receive packets.

Because at block 308, source BFD module $128_2$ transmits a periodic packet to all other BFD modules 128 in data center 102, blocks 310 to 324 are performed for all destination BFD modules 128 on data center 102. That is, if in addition to BFD module $128_2$, data center 102 has five other BFD modules 128, then blocks 310 through 324 are performed a total of five times, once for each destination BFD module 128. For simplicity of explanation, blocks 310 through 324 of method 300 are described with respect to a single destination, which is BFD module $128_n$.

At block 310, destination BFD module $128_n$ determines whether a periodic packet has been received. If not, then block 310 loops back on itself, to block 310, and continues to wait until a periodic packet is received. When destination BFD module $128_n$ receives the periodic packet from source BFD module $128_2$, method 300 proceeds to block 312.

At block 312, destination BFD module $128_n$ analyzes the periodic packet received at block 310. The analysis may include obtaining information from the packet that would allow destination BFD module $128_n$ to determine whether the received periodic packet contains hypervisor state information. The analysis may also include obtaining information from the received packet regarding capacity of source BFD module $128_2$ to process periodic packets, and in response, adjusting the predetermined time interval at which periodic packets are exchanged between BFD modules 128 of data center 102. The analysis may also include obtaining information from the received packet regarding the authenticity of the sender, and in response, continuing with method 300 if the sender is determined to be authentic, or if the sender is determined to not be authentic, notifying an administrator, rejecting the packet, aborting method 300, or a combination of these.

At block 314, if the received periodic packet does not contain hypervisor state information, then the periodic packet is a simple "hello" packet that was not modified by blocks 304 and 306, and method 300 proceeds to block 316. Still at block 314, if the received periodic packet contains hypervisor state information, then method 300 proceeds to block 318. For purposes of block 314, it assumed that if the periodic packet contains hypervisor state information, then the periodic packet also has its echo bit set within its BFD header, such as set to TRUE.

Whether the periodic packet contains hypervisor state information at block 314 may be determined by a variety of ways. One embodiment includes checking for presence of a BFD payload, such as by checking (e.g., reading and analyzing) the length of the periodic packet. If the periodic packet has a length greater than a known length of a periodic packet without a payload, the BFD module determines the periodic packet contains hypervisor state information. If the periodic packet has a length equal to the known length of a periodic packet without a payload, the BFD module determines the periodic packet does not contain hypervisor state information. If the BFD payload of an unmodified periodic packet contains information in the BFD payload, then the length and/or content of the BFD payload may be checked for hypervisor state information. In another embodiment, a periodic packet including hypervisor state information may have set a bit or flag within the BFD header or an encapsulation header, or include information other than a bit or flag within the BFD header or an encapsulation header indicating whether the periodic packet includes hypervisor state information or not.

At block 316, destination BFD module $128_n$ notes that source VTEP $174_2$ containing source BFD module $128_2$ is operating in a normal, healthy manner. After block 316, method 300 ends.

At block 318, destination BFD module $128_n$ extracts hypervisor state information of source hypervisor $116_2$ from the received periodic packet and passes the extracted state information of hypervisor $116_2$ to hypervisor $116_n$. Alternatively, destination BFD module $128_n$ may pass the received periodic packet to hypervisor $116_n$, and hypervisor $116_n$ then extracts the state information of hypervisor $116_2$ from the received periodic packet. As part of block 318, destination BFD module $128_n$ performs similar operations as in block 316 of noting that source VTEP $174_2$ containing source BFD module $128_2$ is operational.

At block 320, destination hypervisor $116_n$ processes the extracted information on the state of source hypervisor $116_2$ and updates its own records regarding the state of source hypervisor $116_2$. Following the example above, destination hypervisor $116n$ would update its records to reflect that VM 118 is associated with VTEP $174_2$ of hypervisor $116_2$.

At block 322, destination BFD module $128_n$ transmits an "echo" packet to source BFD module $128_2$ as an acknowledgement that the periodic packet of blocks 304 and 306 containing hypervisor state information has been received. Block 322 may be performed before blocks 318 and/or 320, or in parallel with blocks 318 and/or 320.

At block 324, source BFD module $128_2$ waits for an "echo" packet from destination BFD module $128_n$. If source BFD module $128_2$ does not receive an expected "echo" packet for a period of waiting time, then source BFD module determines that the packet that was created and sent at blocks 304 to 308 was lost and needs to be retransmitted to destination BFD module $128_n$. If the packet created and sent at blocks 304 to 308 is determined, by source BFD module $128_n$ to have been lost, then method 300 returns to step 304 of method 300. It should be noted that block 324 may be reached as a result of block 310 looping for the period of waiting time of block 324. Block 310 looping for the predetermined period of waiting time might occur if the modified periodic packet containing hypervisor state information was lost in the network(s) of data center 102. If block 310 loops for the period of waiting time of block 324, then method 300 will also return to block 304 so as to resend the packet containing state of source hypervisor 116₂. If source BFD module 128₂ receives the expected "echo" packet at block 324, then method 300 ends.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A method for data delivery, on a network, between a first host and a second host, the method comprising:

determining whether the first host has control information to send to the second host, wherein the control information is state information of a first hypervisor of the first host;
generating a first packet according to a Bidirectional Forwarding Detection (BFD) protocol;
setting a flag in the first packet to activate an acknowledgment mechanism;
modifying the first packet of the BFD protocol to add a control message in the first packet as a payload of the first packet, the control message comprising the control information; and
transmitting the first packet from the first host to the second host.

2. The method of claim 1, further comprising:
receiving the first packet by the second host;
extracting from the first packet the control information;
updating a record of the second host to include the control information; and
transmitting, from the second host, a BFD acknowledgement packet to the first host.

3. The method of claim 2, further comprising:
determining, by the first host, whether the BFD acknowledgement packet has been received from the second host; and
responsive to the determining, retransmitting the first packet to the second host.

4. The method of claim 2, further comprising:
analyzing, by the second host, the first packet; and
performing at least one of:
determining authenticity of the first packet; and
determining capacity of the first host to process incoming packets, and responsive to the determining of capacity, adjusting a time interval at which BFD packets are transmitted between the first host and the second host.

5. The method of claim 1, wherein the transmitting is through a data plane of the network.

6. The method of claim 1, further wherein:
the first host comprises the first hypervisor, the first hypervisor comprises a first virtual tunnel endpoint (VTEP), the first VTEP comprises a first module;
the second host comprises a second hypervisor, the second hypervisor comprises a second VTEP, the second VTEP comprises a second module; and
the transmitting comprises transmitting the first packet from the first module to the second module.

7. The method of claim 1, further comprising:
determining by the second host that the first packet includes the control information, based on a length of the first packet.

8. A non-transitory computer readable medium comprising instructions to be executed in a processor of a computer system, the instructions when executed in the processor cause the computer system to carry out a method of data delivery, on a network, between a first host and a second host, the method comprising:
determining whether the first host has control information to send to the second host wherein the control information is state information of a first hypervisor of the first host;
generating a first packet according to a Bidirectional Forwarding Detection (BFD) protocol;
setting a flag in the first packet to activate an acknowledgment mechanism;
modifying the first packet of the BFD protocol to add a control message in the first packet as a payload of the first packet, the control message comprising the control information; and
transmitting the first packet from the first host to the second host.

9. The non-transitory computer readable medium of claim 8, further comprising:
receiving the first packet by the second host;
extracting from the first packet the control information;
updating a record of the second host to include the control information; and
transmitting, from the second host, a BFD acknowledgement packet to the first host.

10. The non-transitory computer readable medium of claim 9, further comprising:
determining, by the first host, whether the BFD acknowledgement packet has been received from the second host; and
responsive to the determining, retransmitting the first packet to the second host.

11. The method of claim 9 further comprising:
analyzing, by the second host, the first packet; and
performing at least one of:
determining authenticity of the first packet; and
determining capacity of the first host to process incoming packets, and responsive to the determining of capacity, adjusting a time interval at which BFD packets are transmitted between the first host and the second host.

12. The non-transitory computer readable medium of claim 8, wherein the transmitting is through a data plane of the network.

13. The non-transitory computer readable medium of claim 8, further wherein:
the first host comprises the first hypervisor, the first hypervisor comprises a first virtual tunnel endpoint (VTEP), the first VTEP comprises a first module;
the second host comprises a second hypervisor, the second hypervisor comprises a second VTEP, the second VTEP comprises a second module; and
the transmitting comprises transmitting the first packet from the first module to the second module.

14. The non-transitory computer readable medium of claim 8, further comprising:
determining by the second host that the first packet includes the control information, based on a length of the first packet.

15. A computer system comprising:
a first host;
a second host;
a network connecting the first host and the second host; and
a processor, wherein the processor is programmed to carry out a method of data delivery, on the network, between the first host and the second host, the method comprising:
determining whether the first host has control information to send to the second host, wherein the control information is state information of a first hypervisor of the first host;
generating a first packet according to a Bidirectional Forwarding Detection (BFD) protocol;
setting a flag in the first packet to activate an acknowledgment mechanism;

modifying the first packet of the BFD protocol to add a control message in the first packet as a payload of the first packet, the control message comprising the control information; and transmitting the first packet from the first host to the second host.

16. The method of claim 15, further comprising:

receiving the first packet by the second host;

extracting from the first packet the control information;

updating a record of the second host to include the control information; and transmitting, from the second host, a BFD acknowledgement packet to the first host.

17. The method of claim 16, further comprising:

determining, by the first host, whether the BFD acknowledgement packet has been received from the second host; and responsive to the determining, retransmitting the first packet to the second host.

18. The method of claim 16 further comprising:

analyzing, by the second host, the first packet; and performing at least one of:
- determining authenticity of the first packet; and
- determining capacity of the first host to process incoming packets, and responsive to the determining of capacity, adjusting a time interval at which BFD packets are transmitted between the first host and the second host.

* * * * *